(12) United States Patent
Lady

(10) Patent No.: US 7,886,699 B2
(45) Date of Patent: *Feb. 15, 2011

(54) ANIMAL TRAINING APPARATUS

(76) Inventor: Linda J. Lady, 425 Sherman Ave. Suite 230, Palo Alto, CA (US) 94306

( * ) Notice: Subject to any disclaimer, the term of this patent is extended or adjusted under 35 U.S.C. 154(b) by 0 days.

This patent is subject to a terminal disclaimer.

(21) Appl. No.: 12/107,049

(22) Filed: Apr. 21, 2008

(65) Prior Publication Data
US 2008/0190380 A1 Aug. 14, 2008

Related U.S. Application Data

(63) Continuation of application No. 11/456,821, filed on Jul. 11, 2006, now Pat. No. 7,387,087.

(51) Int. Cl.
A01K 15/02 (2006.01)
(52) U.S. Cl. .................. 119/792; 119/856; 119/907; 119/905
(58) Field of Classification Search .............. 119/792, 119/856, 793, 794, 786, 787, 788, 771, 863, 119/864, 905, 907; 54/71
See application file for complete search history.

(56) References Cited

U.S. PATENT DOCUMENTS

| 1,685,435 A | 9/1928 | Philbrick | |
|---|---|---|---|
| 2,026,383 A | 12/1935 | Gyulay | |
| 2,778,335 A | 1/1957 | Hirsch | |
| 3,768,445 A | 10/1973 | Sorrels | |
| 3,769,939 A | 11/1973 | Wais et al. | |
| 4,667,624 A | 5/1987 | Smith | |
| 4,676,198 A * | 6/1987 | Murray | 119/771 |
| 4,838,206 A * | 6/1989 | Anderson et al. | 119/831 |
| 5,038,717 A | 8/1991 | Bent | |
| 5,199,383 A | 4/1993 | Lagana | |
| 5,243,931 A | 9/1993 | McDonough | |
| 5,247,905 A * | 9/1993 | Arakawa | 119/863 |
| 5,325,819 A * | 7/1994 | Krauss | 119/792 |
| 5,329,885 A | 7/1994 | Sporn | |
| 5,383,426 A * | 1/1995 | Krauss | 119/793 |
| 5,433,688 A | 7/1995 | Davies | |
| 5,511,515 A | 4/1996 | Brown et al. | |
| 5,676,093 A | 10/1997 | Sporn | |
| 5,724,920 A * | 3/1998 | Meisman et al. | 119/771 |

(Continued)

OTHER PUBLICATIONS

U.S. Appl. No. 12/818,595 Interference Suggestion filed on Jun. 18, 2010.

Primary Examiner—Yvonne R. Abbott
(74) Attorney, Agent, or Firm—Peters Verny, LLP

(57) ABSTRACT

An animal training apparatus is comprised of a leash connector attached to a chest portion of a harness. The harness is arranged to prevent the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for pulling on the chest portion of the harness. The animal is prevented by the rotational force from pulling further.

20 Claims, 7 Drawing Sheets

U.S. PATENT DOCUMENTS

| | | | |
|---|---|---|---|
| 5,842,444 A | 12/1998 | Perrulli | |
| 5,893,339 A | 4/1999 | Liu | |
| 5,896,831 A | 4/1999 | Alpert | |
| 5,937,794 A | 8/1999 | Hediger | |
| 5,937,795 A * | 8/1999 | Raphael | 119/869 |
| 6,085,694 A | 7/2000 | Simon | |
| 6,095,094 A * | 8/2000 | Phillips | 119/792 |
| D434,535 S * | 11/2000 | Koch | D30/152 |
| 6,167,844 B1 | 1/2001 | Cantrell et al. | |
| 6,314,915 B1 | 11/2001 | Pope et al. | |
| 6,371,056 B1 * | 4/2002 | Phillips | 119/793 |
| 6,374,778 B1 | 4/2002 | Glussich | |
| 6,427,631 B1 * | 8/2002 | Ross | 119/496 |
| 6,450,129 B1 | 9/2002 | Flynn | |
| 6,450,130 B1 | 9/2002 | Goldberg | |
| 6,516,748 B1 * | 2/2003 | Jackson | 119/72 |
| 6,606,967 B1 * | 8/2003 | Wolfe et al. | 119/856 |
| 6,662,753 B1 | 12/2003 | Sporn | |
| 6,694,923 B1 * | 2/2004 | Fouche | 119/792 |
| 6,773,366 B2 | 8/2004 | Gray | |
| D511,596 S * | 11/2005 | Mugford | D30/152 |
| 6,984,184 B2 | 1/2006 | Gray | |
| 7,004,114 B2 * | 2/2006 | Hippensteel | 119/856 |
| 7,055,464 B2 * | 6/2006 | Pettersson | 119/864 |
| 7,165,511 B1 * | 1/2007 | Brezinski | 119/792 |
| 7,370,608 B1 * | 5/2008 | Friedman | 119/850 |
| 2005/0009647 A1 | 1/2005 | Gray | |
| 2005/0022752 A1 * | 2/2005 | Leon | 119/771 |
| 2006/0102102 A1 * | 5/2006 | Bennett et al. | 119/792 |
| 2007/0204805 A1 * | 9/2007 | Brody | 119/796 |

* cited by examiner

ANIMAL TRAINING APPARATUS

CROSS-REFERENCE TO RELATED APPLICATIONS

This application is a continuation of U.S. patent application Ser. No. 11/456,821 filed Jul. 11, 2006 and now U.S. Pat. No. 7,387,087; which claimed priority and benefit of U.S. patent application Ser. No. 10/341,930 filed Jan. 14, 2003 and now U.S. Pat. No. 7,107,939; which claimed priority and benefit of the provisional U.S. Patent Application No. 60/392,746 filed Jun. 27, 2002. The disclosures of the above applications are hereby incorporated herein by reference.

BACKGROUND OF THE INVENTION

1. Field of the Invention

The invention broadly relates to animal harnesses and leashes.

2. Prior Art

An animal leash is typically connected to a collar worn around the neck of an animal. The collar is free to rotate around the neck. An animal, such as a dog, that has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck.

Many types of animals have an opposition reflex that makes them instinctively move toward the part of their bodies on which they feel pressure. Since the dog feels pressure at the front part of the collar when he pulls on a leash that has been rotated to the back, the collar encourages the dog to pull away from its handler with even greater force. As another example, the opposition reflex of a horse causes it to turn towards the side where the rider's leg applies pressure.

In addition to collars, there are animal harnesses that wrap around the torso. A typical harness has a leash attachment at the back of the animal, but a back-mounted leash cannot be used to give the animal cues for learning commands such as sit, down, and come. The back-mounted leash also signals the animal to pull on the leash, similar to a neck collar, because of the pressure on the front of the chest when the animals pulls the leash taut. Some prior art harnesses discourage pulling behavior by providing devices that rub, chafe, or hobble the animal's front legs, but these devices cause stress and discomfort.

SUMMARY OF THE INVENTION

Accordingly, the objects of the present animal training apparatus and method are:

to prevent an animal from pulling on its leash;
to facilitate applying turning signals to the animal;
to give an animal cues for learning commands such as sit, down, and come;
to be adjustable for fitting different size animals;
to be comfortable to wear;
to not rub the armpits or forearms; and
to enable the animal to walk freely without hobbling its movements.

The present invention is an animal training apparatus that is comprised of a leash connector attached to a chest portion of a harness. The harness is arranged for preventing the leash connector from shifting to the back of the animal.

The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside.

The leash connector is attached to an intermediate position on the chest strap for controlling an animal by pulling the chest strap in the appropriate direction. For example, it can apply a rotating force to the animal when the animal moves forwards of the handler and pulls on the leash connector. The animal is prevented by the rotational force from pulling further.

By this design, when the animal brings the leash taut, it is not encouraged to pull further by pressure on the chest, but is instead turned by pressure on the sides, thereby discouraging pulling.

DETAILED DESCRIPTION OF THE INVENTION

Figure 1:
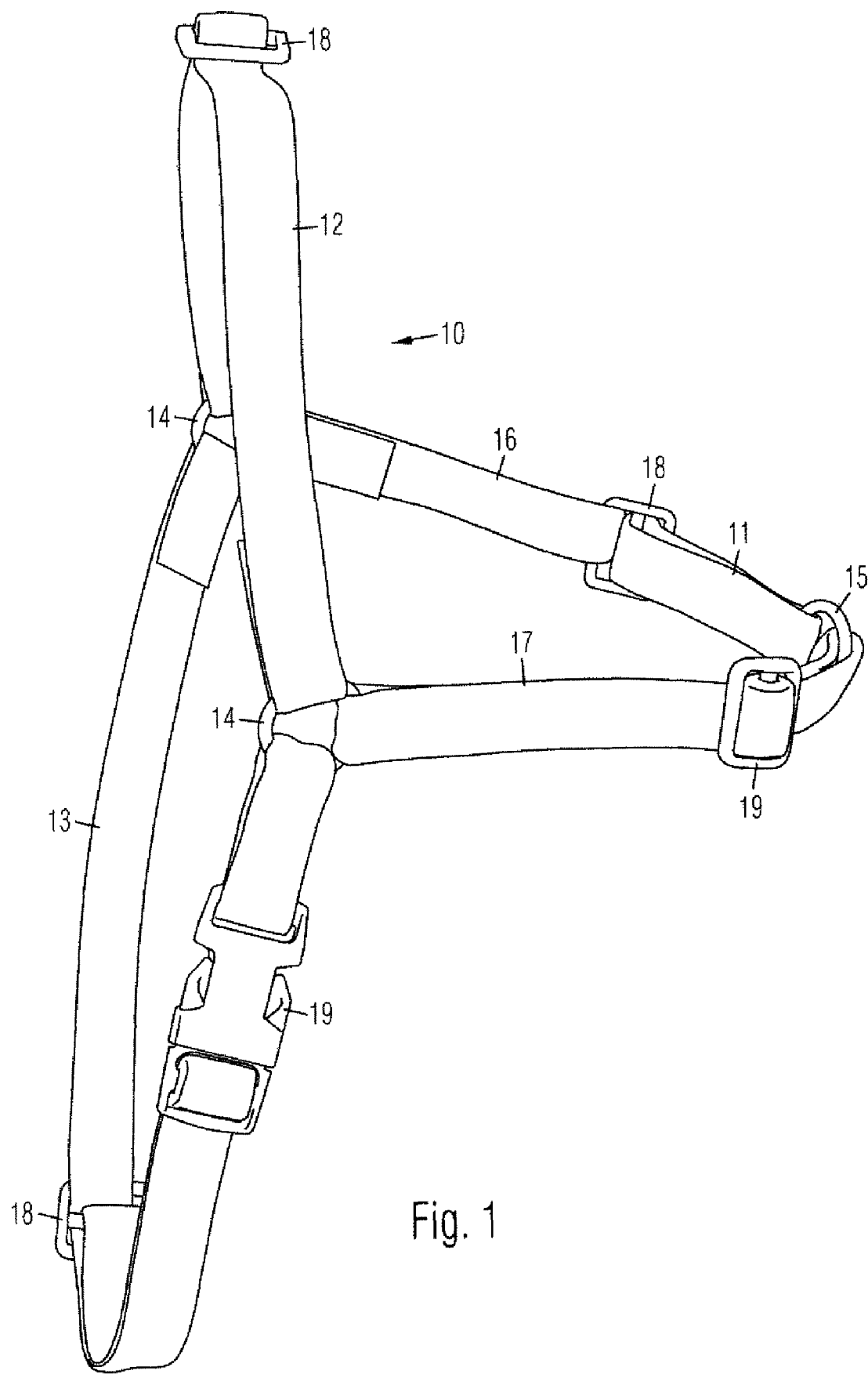
FIG. 1 is a side perspective view of the present invention.

In accordance with a first embodiment of the invention shown in the front view of FIG. 1, an animal harness (10) is comprised of a chest strap (11), a withers strap (12), and a girth strap (13), which are preferably made of webbing. Adjacent ends of the straps (11-13) are connected together, preferably by side connectors (14), which are preferably comprised of rings that allow the chest strap (11) to pivot up and down. Alternatively, the ends of the straps (11-13) may be connected together without a connector, such as by sewing, gluing, or other means, or they may be integrally connected to each other.

A leash connector (15) is attached to an intermediate position on the chest strap (11). In this example, the chest strap (11) is comprised of a left strap (16) and a right strap (17) connected by the leash connector (15), which is comprised of a ring. Alternatively, the chest strap (11) may be comprised of a single strap, and the leash connector (15) may be attached to an intermediate position or any other position on the single strap. Also, the leash connector (15) may be any suitable type of connector for connecting to a leash. There may be a plurality of leash connectors on the chest strap (11).

The withers strap (12) and the girth strap (13) each includes at least one length adjuster (18), such as a slide buckle, for adjusting its length to fit different size animals. The chest strap (11) preferably includes two width adjusters (18) on either side of the leash connector (15), so as to enable adjusting the length of the chest strap (11), and preferably maintaining the leash connector (15) generally centered along the chest strap (11). Alternatively, the length adjusters (18) may be eliminated and the straps (11-13) may be sized to fit an animal of a predetermined size.

A releasable connector (19) is attached along one of the straps (11-13), preferably a girth strap (13). An identification tag (not shown) or a cord (not shown) may be attached to the leash connector (15) for connecting a leash.

Figure 2:
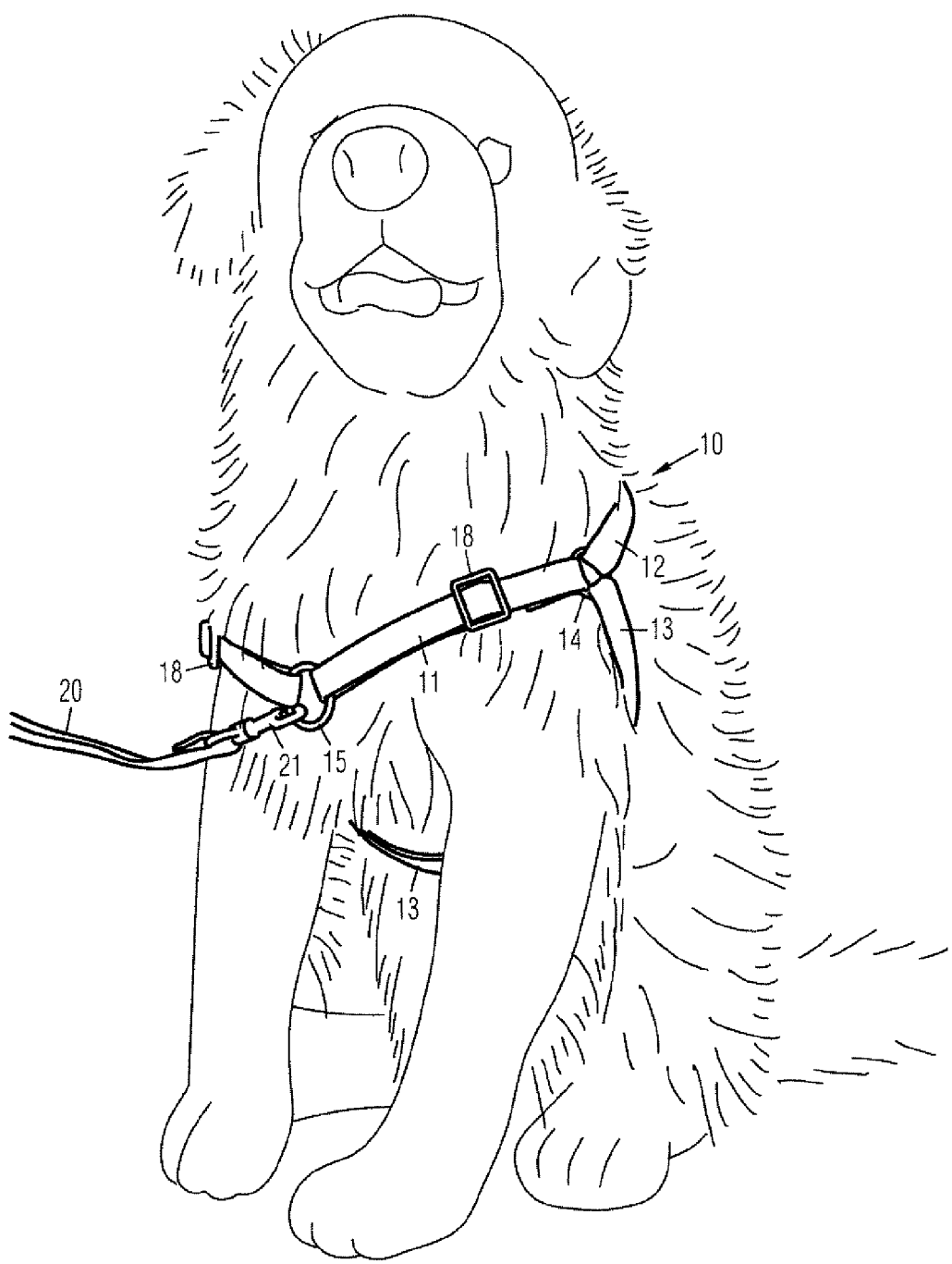
FIG. 2 is a front perspective view of the invention on an animal.
Figure 3:
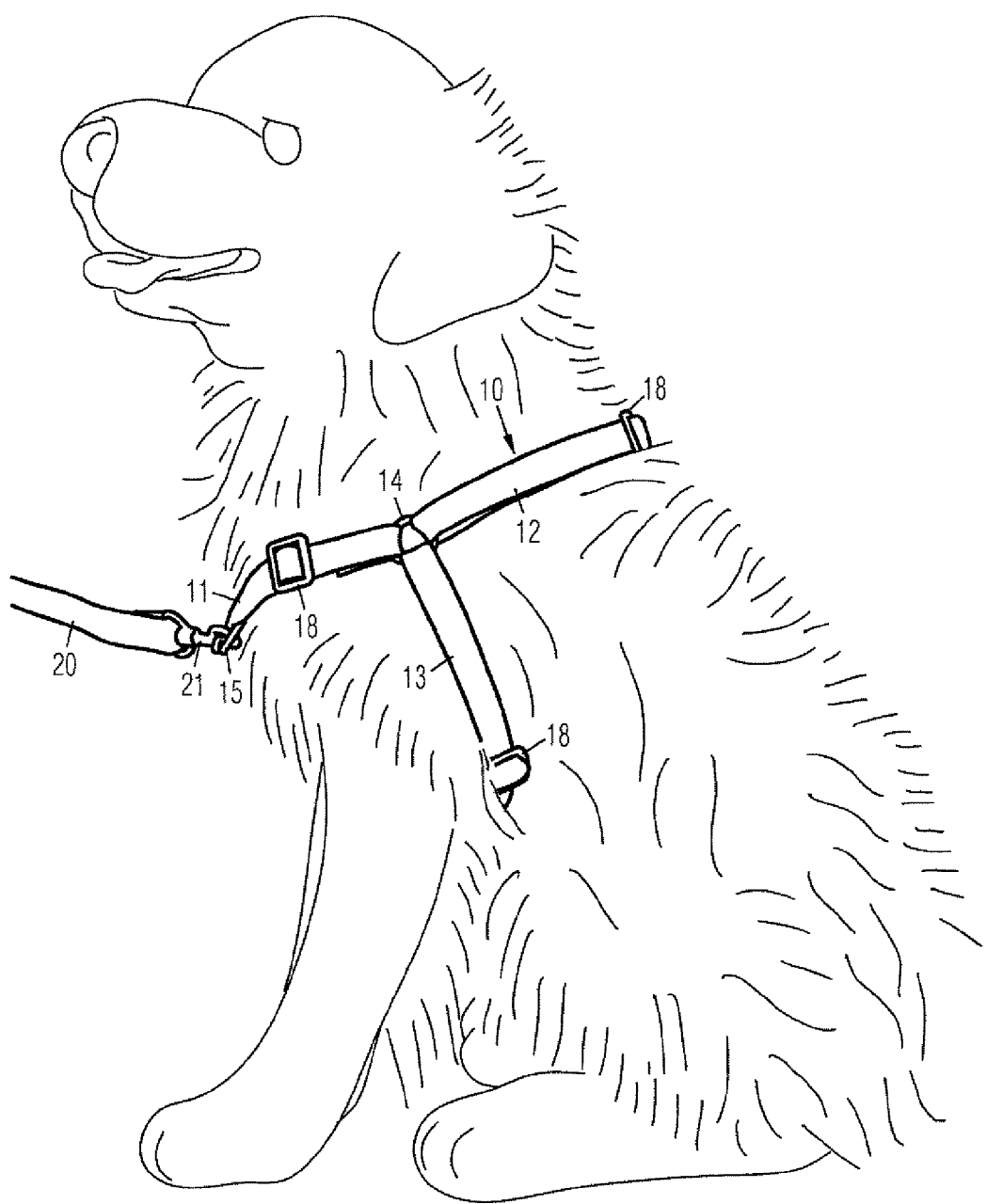
FIG. 3 is a side view of the invention on the animal.

In FIGS. 2 and 3, a harness (10) is shown worn on animal, which is a dog in this example. The harness (10) is most suitable for dogs, but it may be used for other four legged animals. A releasable connector (19) (FIG. 1) is disconnected for enabling the harness (10) to be put on the animal by sliding the chest strap (11) and the withers strap (12) down around its neck without lifting its legs. The releasable connector (19) is reconnected after the chest strap (11) and the withers strap (12) are in position. The chest strap (11) is positioned across the animal's chest, which is the portion between the tops of the front legs. The withers strap (12) is positioned across the withers, which is the portion between the shoulders behind the neck. The girth strap (13) is positioned across the girth, which is the portion on the underside behind the front legs. A leash (20) with a releasable connector (21) at the proximal end is connected to the leash connector (15) on the chest strap (11).

Length adjusters (18) on the straps (11-13) are adjusted to fit the animal. Side connectors (14) are generally positioned at the shoulders where the animal can easily feel them for receiving turning signals. The chest strap (11) is preferably adjusted to be loose enough for pivoting up and down about side connectors (14). The harness (10) is comfortable to wear because it may be worn relatively loosely, and because it does not rub the armpits or forearms like some prior art harnesses do. Accordingly, it allows the animal to walk freely without hobbling its movements.

Figure 4:
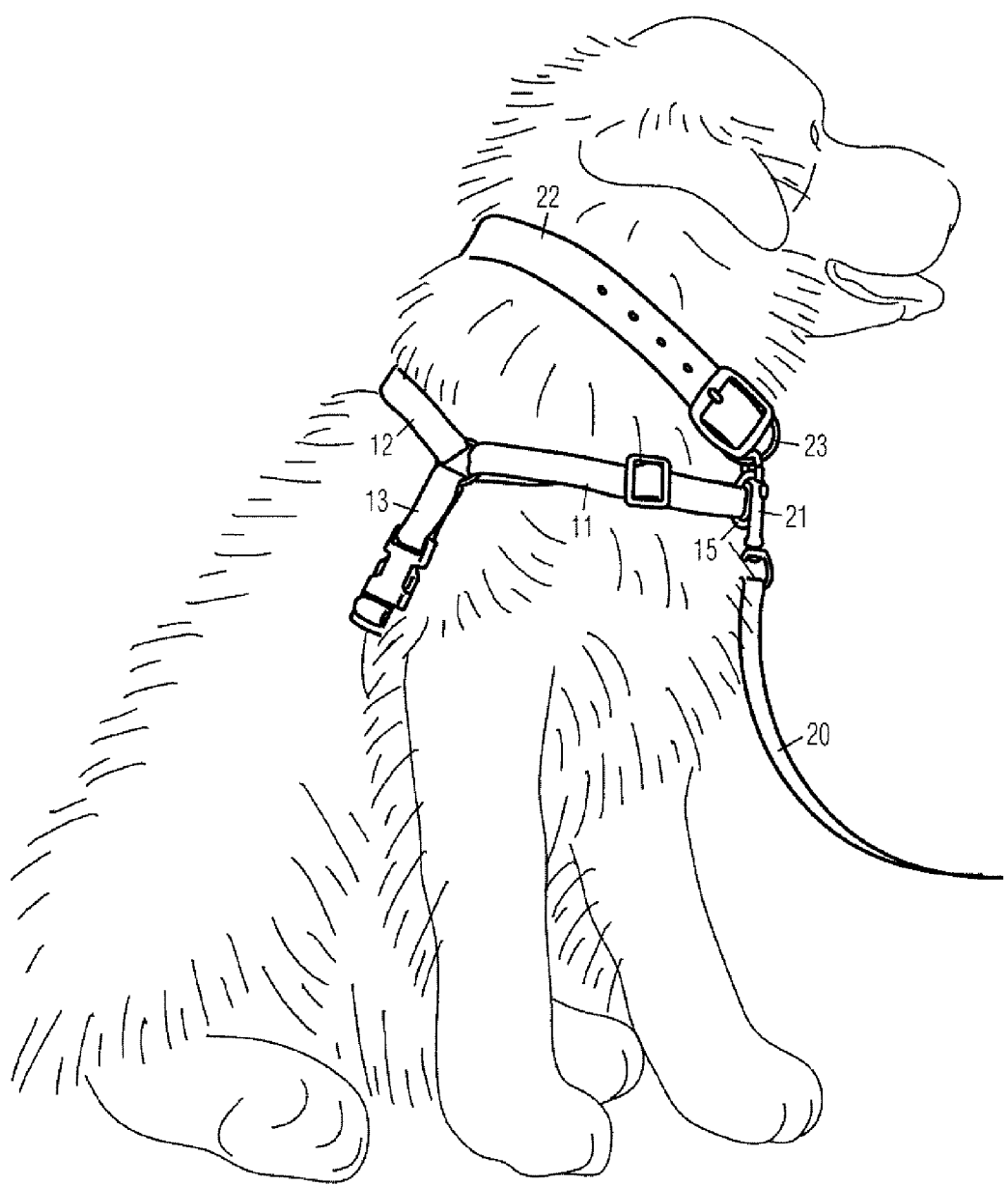
FIG. 4 is a side view of an alternative embodiment of the invention.

An alternative embodiment of the harness is shown in FIG. 4. It includes a collar (22) worn above a chest strap (11) and a withers strap (12). A leash connector (23) on collar (22) is connected to a leash connector (15) on the chest strap (11) by releasable connector (21) on the leash. The collar (22) provides additional control and signaling, as well as enabling an easier transition for an animal owner who is accustomed to using a collar alone. When the owner is familiar with using the harness, the collar (22) may be removed.

Figure 5:
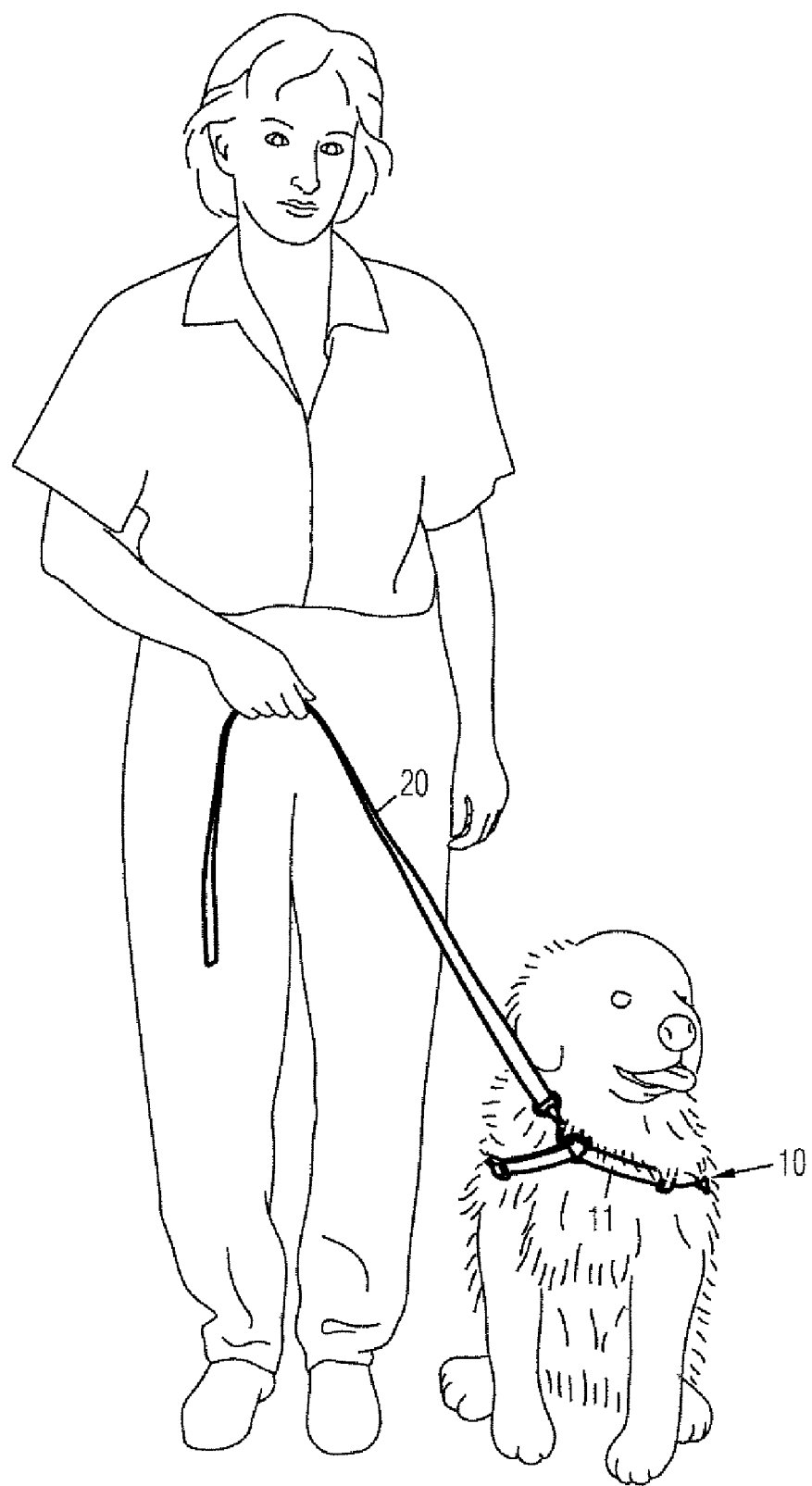
FIG. 5 is a front view of the invention when the animal is being instructed to proceed forward.
Figure 6:
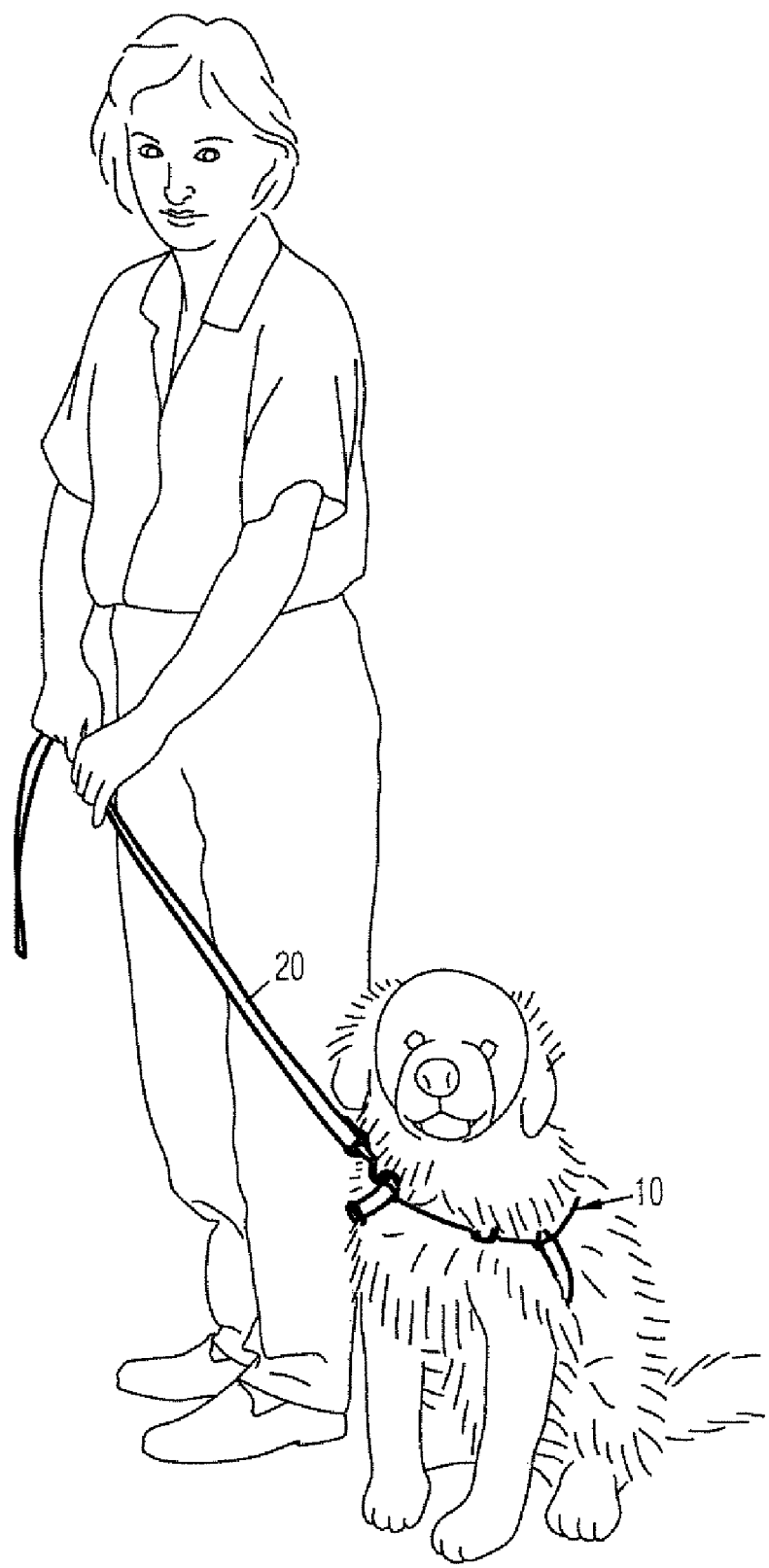
FIG. 6 is a front view the invention when the animal is being instructed to turn right.
Figure 7:
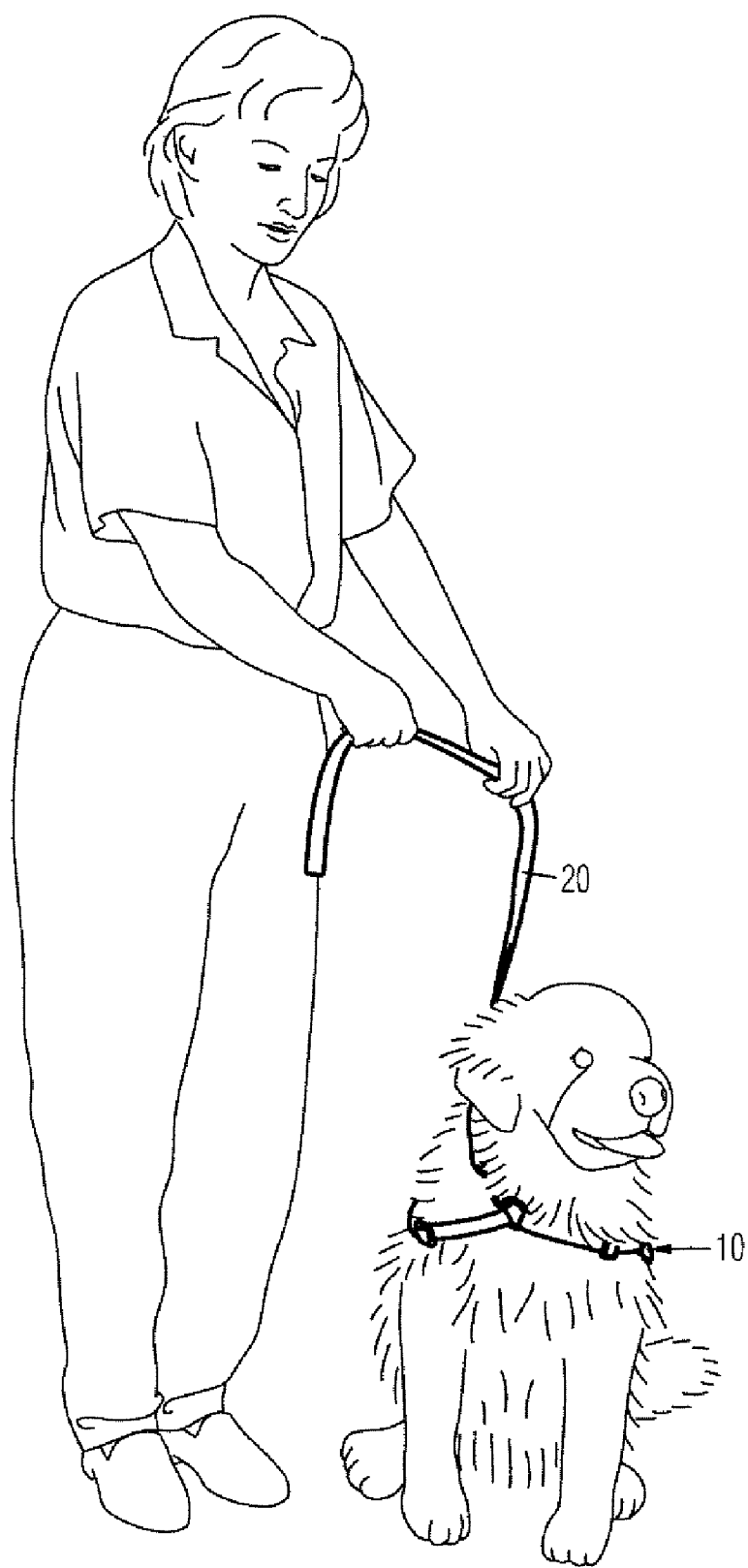
FIG. 7 is a front view invention when the animal is being instructed to turn left.

A method for training the animal wearing a harness (10) is shown in FIGS. 5-7. As an example, a trainer is shown on the right of the animal, but the trainer may be on the left instead.

In FIG. 5, the animal is instructed to proceed forward by pulling a leash (20) forward to apply pressure on the animal's withers and girth. If the animal moves forwards of the trainer and pulls the leash (20) taut, the leash connector (15) (FIG. 1) and the leash (20) apply a force to the sides and shoulders of the animal to produce a rotational effect on the animal since the leash connector (15) and the leash (20) are attached to the chest strap (11). The animal is signaled to turn toward the trainer and stopped from pulling on the leash (20).

The harness (10) eliminates the signals that prior art leashes and harnesses provide to cause the animal to pull on the leash (20). The animal will quickly learn to walk with the trainer instead of forcing its way ahead and pulling on the leash (20). The animal is instructed to sit or to stop walking by pulling the leash (20) upward to apply pressure on the animal's girth.

In FIG. 6, the animal is instructed to turn right by pulling the leash (20) to the right to apply pressure to the animal's left shoulder. In FIG. 7, the animal is instructed to turn left by pulling the leash (20) to the left to apply pressure to the right side of the animal's neck. If the animal is on the trainer's right side, the animal is instructed to turn right by pulling the leash (20) to the right to apply pressure to the left side of the animal's neck.

Although the above description is specific, they should not be considered as limitations on the scope of the invention, but only as examples of the embodiments. Many substitutes and variations are possible within the teachings of the invention. For example, the harness may be used with a collar or without the leash by grabbing the chest strap and pulling it in the appropriate direction. A collar may be considered as being comprised of a chest strap and a withers strap. The buckles may be replaced with hook-and-loop fasteners. A different harness may be provided for securing the leash connector at the chest of the animal. Therefore, the scope of the invention should be determined by the appended claims and their legal equivalents, not by the examples given.

What is claimed is:

1. An animal training apparatus, comprising:
   a. a forechest strap configured to be positioned across a forechest of an animal across its shoulders;
   b. a back strap configured to be positioned across a back of the animal at or behind its shoulders;
   c. a girth strap configured to be positioned across a girth of the animal behind the front legs on an underside of the animal, wherein respective opposite ends of the forechest strap, the back strap, or the girth strap are connected together on each of the right and left sides of the animal and the straps are of such relative length so as to place the connections at or behind the shoulders of the animal; and
   d. a leash connector attached to an intermediate position of the forechest strap and configured for applying a rotational force to the shoulders of the animal when the animal moves forwards of a handler and pulls on the leash connector.

2. The animal training apparatus of claim 1, further including side connectors configured for connecting adjacent ends of the forechest strap, the back strap, or the girth strap, wherein the side connectors can be positioned at or behind the shoulders of the animal.

3. The animal training apparatus of claim 1, further including a releasable connector along the girth strap that allows the girth strap to be opened and thus allows the harness to be attached to the animal without lifting the front legs.

4. An apparatus, comprising:
   a. a forechest strap configured to be positioned across a forechest of an animal across its shoulders;
   b. a back strap configured to be positioned across a back of the animal at or behind its shoulders;
   c. a girth strap configured to be positioned across a girth of the animal behind the front legs on an underside of the animal, wherein respective opposite ends of the forechest strap, the back strap, and the girth strap are coupled together; and
   d. a leash connector attached to an intermediate position on the forechest strap and configured for attachment of a leash.

5. The apparatus of claim 4, wherein the forechest strap back strap and girth strap are further configured for pulling the forechest portion of the strap and thereby selectively applying pressure behind the animal's shoulders, under the girth, and over the back.

6. The apparatus of claim 4, further including a leash connected to the leash connector.

7. The animal training apparatus of claim 4, further including side connectors connecting adjacent ends of the forechest strap, the back strap, and the girth strap, wherein the side connectors are configured to be positioned at or behind the shoulders of the animal.

8. The apparatus of claim 4, further including a releasable connector along the girth strap to enable the girth strap to be opened and thus enable the harness to be worn around the animal without lifting the front legs.

9. The apparatus of claim 4, wherein the back strap, the girth strap, and the forechest strap are of relative length so as to position the connections on each side of the animal at or behind its shoulders.

10. The apparatus of claim 4, wherein the lengths of the back strap, the girth strap, and the forechest strap are adjustable so as to be able to position the connections on each side of the animal at or behind its shoulders.

11. The apparatus of claim 4, further comprising a collar configured to be positioned around the neck of the animal and attached to the forechest strap or the leash connector.

12. The apparatus of claim 4, further comprising a collar configured to be positioned around the neck of the animal and attached to the leash connector or forechest strap using a leash.

13. The apparatus of claim 4, further comprising a second leash connector attached to the forechest strap.

14. An apparatus comprising:
 a harness configured to be attached proximate to the shoulders of an animal; and
 a leash connector attached to the harness such that the leash connector is disposed proximate to the chest of the animal below the neck and forward of the forelegs of the animal, the leash connector being prevented from moving above the neck of the animal by the harness, the leash connector being prevented from moving behind the forelegs of the animal by the harness, the harness being configured to apply pressure to the shoulders of the animal in response to tension on a leash connected to the leash connector.

15. The apparatus of claim 14, wherein the leash connector comprises a metal ring or cord.

16. The apparatus of claim 14, further comprising a collar attached to the harness.

17. The apparatus of claim 14, further comprising a collar attached to the harness using the leash connector.

18. The apparatus of claim 14, further comprising a collar attached to the harness using a releasable connector.

19. The apparatus of claim 14, wherein the harness includes a hook-and-loop fastener.

20. An apparatus comprising:
 a harness configured to be attached proximate to the shoulders of an animal; and
 a leash connector attached to the harness such that the leash connector is disposed proximate to the chest of the animal below the neck and forward of the forelegs of the animal, the leash connector being prevented from moving above the neck of the animal by the harness, the leash connector being prevented from moving behind the forelegs of the animal by the harness;
 wherein the harness is configured to be attached to the animal without lifting the forelegs of the animal.

\* \* \* \* \*